United States Patent [19]
East et al.

[11] 4,355,133
[45] Oct. 19, 1982

[54] POLYESTER OF 6-HYDROXY-2-NAPHTHOIC ACID, 4-HYDROXY BENZOIC ACID, 1,4-CYCLOHEXANEDICARBOXYLIC ACID, AND AROMATIC DIOL CAPABLE OF READILY UNDERGOING MELT PROCESSING TO FORM ARTICLES POSSESSING HIGH IMPACT PROPERTIES

[75] Inventors: Anthony J. East, Madison; Gordon W. Calundann, North Plainfield, both of N.J.

[73] Assignee: Celanese Corporation, New York, N.Y.

[21] Appl. No.: 287,345

[22] Filed: Jul. 27, 1981

[51] Int. Cl.$^3$ .............................................. C08G 63/60
[52] U.S. Cl. ...................................... 524/604; 524/601; 528/173; 528/190; 528/191; 528/193; 528/271
[58] Field of Search ............... 528/173, 190, 191, 271, 528/193; 260/40 R, 40 P; 524/601, 604

[56] References Cited

U.S. PATENT DOCUMENTS

| | | | |
|---|---|---|---|
| 3,143,526 | 8/1964 | Caldwell et al. | 528/190 |
| 4,083,829 | 4/1978 | Calundann et al. | 528/193 |
| 4,161,470 | 7/1979 | Calundann | 260/40 P |
| 4,232,143 | 11/1980 | Irwin | 528/191 |
| 4,256,624 | 3/1981 | Calundann | 528/190 |
| 4,279,803 | 7/1981 | Calundann | 260/40 P |

Primary Examiner—Lester L. Lee
Attorney, Agent, or Firm—Burns, Doane, Swecker & Mathis

[57] ABSTRACT

A novel polyester is provided which has been found to exhibit an optically anisotropic melt phase which enables it readily to undergo melt processing to form quality molded articles possessing unusually high impact properties, etc. The polyester of the present invention contains recurring 6-oxy-2-naphthoyl, 4-oxybenzoyl, and 1,4-dicarboxycyclohexane moieties in addition to a moiety derived from an aromatic diol in the proportions indicated. The hydrogen atoms present upon the aromatic rings optionally may be at least partially substituted (as described). The polyester is capable of forming the desired anisotropic melt at a temperature below approximately 350° C., and in a particularly preferred embodiment at a temperature below approximately 320° C.

23 Claims, No Drawings

POLYESTER OF 6-HYDROXY-2-NAPHTHOIC ACID, 4-HYDROXY BENZOIC ACID, 1,4-CYCLOHEXANEDICARBOXYLIC ACID, AND AROMATIC DIOL CAPABLE OF READILY UNDERGOING MELT PROCESSING TO FORM ARTICLES POSSESSING HIGH IMPACT PROPERTIES

BACKGROUND OF THE INVENTION

It has been disclosed that certain polyesters may be formed which exhibit melt anisotropy. See, for instance, (a) *Polyester X7G-A Self Reinforced Thermoplastic*, by W. J. Jackson, Jr., H. F. Kuhfuss, and T. F. Gray, Jr. 30th Anniversary Technical Conference, 1975 Reinforced Plastics Composites Institute, The Society of the Plastics Industry, Inc., Section 17-D, Pages 1-4, (b) Belgian Pat. Nos. 838,935 and 828,936, (c) Dutch Pat. No. 7505551, (d) West German Nos. 2520819, 2520820, 2722120, 2834535, 2834536 and 2834537, (e) Japanese Nos. 43-223; 2132-116; 3017-692; and 3021-293; (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; and 4,272,625; (g) U.K. Application No. 2,002,404; and (h) European Patent Applications 0008855, 0018145. See also commonly assigned U.S. Ser. Nos. 109,575, filed Jan. 4, 1980 (now U.S. Pat. No. 4,285,852); 128,1759, filed Mar. 10, 1980 (now U.S. Pat. No. 4,299,756); 128,778, filed Mar. 10, 1980 (now U.S. Pat. No. 4,318,841); 169,014, filed July 15, 1980; and 194,196, filed Oct. 6, 1980 (now U.S. Pat. No. 4,279,803); and 194,199, filed Oct. 6, 1980 (now U.S. Pat. No. 4,318,842).

Commonly assigned U.S. Pat. No. 4,161,470 discloses a polyester consisting essentially of 6-oxy-2-naphthoyl and 4-oxybenzoyl moieties.

Commonly assigned U.S. Pat. No. 4,219,461 discloses a polyester consisting essentially of 6-oxy-2-naphthoyl, 4-oxybenzoyl, dioxyaryl and dicarboxyaryl moieties.

U.S. Pat. No. 4,118,372 broadly discloses polyesters which consist essentially of recurring units derived from diacids, diols, and hydroxy acids. The inclusion of a 1,4-dicarboxycyclohexane moiety is disclosed, for example, at column 2, line 5, and in several of the Examples. Furthermore, $R_1$, $R_2$, and $R_3$ in the formulas of U.S. Pat. No. 4,118,372 may be, as defined in Columns 1 and 2, "radicals selected from the group of (1) single and fused 6-membered aromatic carbocyclic ring systems wherein the chain extending bonds of the ring system if attached to the same ring are positioned 1,4- to each other, and if attached to different rings, are in positions parallel and oppositely directed, ..." Two-ring systems are illustrated at Column 2. See also U.S. Pat. No. 3,991,013 which contemplates a polyester which may include a moiety derived from hexahydroterephthalic acid.

In our commonly assigned United States Ser. No. 194,199, filed Oct. 6, 1980 (now U.S. Pat. No. 4,318,842), is disclosed a polyester derived from 6-hydroxy-2-naphthoic acid, aromatic diol, 1,4-cyclohexanedicarboxylic acid, and optionally an aromatic diacid. See also the poly(ester-amide) of commonly assigned U.S. Ser. No. 214,557, filed Dec. 9, 1980.

It is an object of the present invention to provide an improved melt processable polyester capable of forming an anisotropic melt phase at a temperature below approximately 350° C., and preferably below approximately 320° C.

It is an object of the present invention to provide an improved polyester which forms a highly tractable melt phase which is capable of readily undergoing melt processing.

It is an object of the present invention to provide an improved polyester which forms an anisotropic melt phase at a temperature well below its decomposition temperature.

It is a further object of the present invention to provide an improved polyester which is capable of undergoing melt processing to form quality molded articles possessing unusually high impact properties.

These and other objects, as well as the scope, nature, and utilization of the present invention, will be apparent to those skilled in the art from the following detailed description.

SUMMARY OF THE INVENTION

It has been found that a melt processable polyester capable of forming an anisotropic melt phase at a temperature below approximately 350° C. consists essentially of the recurring moieties I, II, III, and IV which optionally may include substitution of at least some of the hydrogen atoms present upon an aromatic ring wherein:

I is 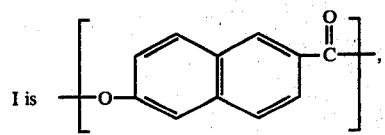

II is 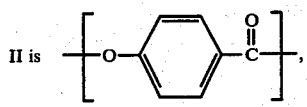

III is 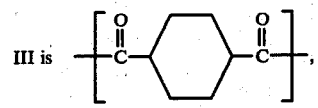

wherein at least approximately 90 percent of the III units are in the trans-configuration, and IV is a dioxyaryl moiety of the formula

where Ar is a divalent radical comprising at least one aromatic ring, with the optional substitution if present being selected from the group consisting of an alkyl group of 1 to 4 carbon atoms, an alkoxy group of 1 to 4 carbon atoms, halogen, a phenyl group, and mixtures of the foregoing, and wherein the polyester comprises approximately 10 to 70 mole percent of moiety I, approximately 10 to 60 mole percent of moiety II, approximately 10 to 45 mole percent of moiety III, and approximately 10 to 45 mole percent of moiety IV.

DESCRIPTION OF PREFERRED EMBODIMENTS

The polyester of the present invention consists essentially of at least four recurring moieties which when combined in the polyester have been found to form an atypical optically anisotropic melt phase at a temperature below approximately 350° C., and preferably below approximately 320° C. The polymer melting temperatures may be confirmed by the use of a differential scanning calorimeter (i.e., DSC) employing repeat scans at a 20° C. per minute heat-up rate and observing the peak of the DSC melt transition. The polyester commonly exhibits a melting temperature of at least 225° C. and preferably of at least 235° C. as determined by differential scanning calorimetry. The polyester of the present invention may exhibit more than one DSC transition temperature. In such a case, the temperature corresponding to the major DSC peak (i.e., the peak having the greatest area beneath it) is taken to be the polymer melting temperature.

Because of its ability to exhibit anisotropic properties (i.e., liquid crystalline properties) in the melt, the polyester can readily form a product having a highly oriented molecular structure upon melt processing. Preferred polyesters are capable of undergoing melt processing at a temperature within the range of approximately 230° to 320° C.

The polyester comprises four essential moieties. Moiety I can be termed a 6-oxy-2-naphthoyl moiety and possesses the structural formula:

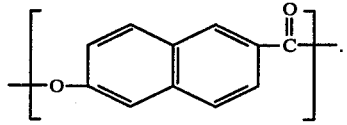

While not specifically illustrated in the structural formula, at least some of the hydrogen atoms present upon the aromatic rings of moiety I may be substituted. Such optical substitution may be an alkyl group of 1 to 4 carbon atoms, an alkoxy group of 1 to 4 carbon atoms, halogen (e.g. Cl, Br, I), a phenyl group, and mixtures of the foregoing. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-5,7-dichloro-2-naphthoic acid, etc. The presence of ring substitution tends to modify to some degree the physical properties of the resulting polymer (e.g., the polymer may soften at a lower temperature, its impact strength may be further increased, and the crystallinity of the solid polymer may be decreased). In a preferred embodiment wherein a polyester of optimum crystallinity in the solid state is desired, no ring substitution is present.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835–45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety I comprises approximately 10 to 70 mole percent of the polyester. In a preferred embodiment, moiety I is present in a concentration of approximately 15 to 30 mole percent, and most preferably in a concentration of approximately 20 mole percent.

The second essential moiety (i.e., moiety II) can be termed a 4-oxybenzoyl moiety and possesses the structural formula:

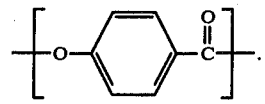

While not specifically illustrated in the structural formula, at least some of the hydrogen atoms present upon the aromatic ring of moiety II may be substituted. Such optional substitution may be an alkyl group of 1 to 4 carbon atoms, an alkoxy group of 1 to 4 carbon atoms, halogen (e.g., F, Cl, Br), a phenyl group, and mixtures of the foregoing. Representative examples of ring substituted compounds from which moiety II can be derived include 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, etc. The presence of ring substitution in moiety II tends to modify to some degree the physical properties of the resulting polymer as previously described in connection with moiety I. In a preferred embodiment wherein a polyester of optimum crystallinity in the solid state is desired, no ring substitution is present. For instance, moiety II is then derived from unsubstituted 4-hydroxybenzoic acid or its derivatives.

Moiety II comprises approximately 10 to 60 mole percent of the polyester. In a preferred embodiment moiety II is present in a concentration of approximately 20 to 40 mole percent, and most preferably in a concentration of approximately 30 mole percent.

The third essential moiety (i.e., moiety III) can be termed a 1,4-dicarboxycyclohexane moiety and possesses the structural formula:

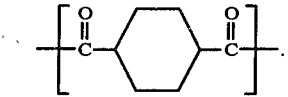

As will be apparent to those skilled in the art, moiety III can be derived from unsubstituted 1,4-cyclohexanedicarboxylic acid (hexahydroterephthalic acid) and substituted derivatives thereof. 1,4-cyclohexanedicarboxylic acid is prepared by the hydrogenation of terephthalic acid or, more commonly, by the hydrogenation of dimethyl terephthalate. 1,4-cyclohexanedicarboxylic acid is available commercially from the Eastman Kodak Company.

Moiety III comprises approximately 10 to 45 mole percent of the polymer. In a preferred embodiment, moiety III is present in a concentration of approximately 20 to 30 mole percent, and most preferably in a concentration of approximately 25 mole percent.

It has been found that only moiety III units in the trans-configuration give rise to a polyester which exhibits anisotropy in the melt phase. This is believed to be due to the disruption and destruction of the rod-like nature of the polymer molecules by the presence of moiety III units in the cis-configuration. However, a relatively small amount of moiety III in the cis-configuration, as compared with the total amount of polymer, can be tolerated without seriously affecting the anisotropic nature of the polymer in the melt. It is nevertheless preferable to maximize the amount of moiety III in the trans-configuration which is present in the polymer. Thus, it is preferred that at least 90 percent (e.g., 95 percent or more) of the moiety III units be present in the trans-configuration.

Trans- and cis-1,4-cyclohexanedicarboxylic acid can be distinguished from one another by such techniques as NMR and IR spectroscopy, as well as by their melting points. A melting point calibration curve is one means by which the relative amounts of trans- and cis-1,4-cyclohexanedicarboxylic acid in a mixture of the isomers can be determined.

The fourth essential moiety (i.e., moiety IV) is a dioxyaryl moiety of the formula +O—Ar—O+ where Ar is a divalent radical comprising at least one aromatic ring. Moiety IV preferably is symmetrical in the sense that the divalent bonds which join the moiety to other moieties in the main polymer chain are symmetrically disposed on one or more aromatic rings (e.g., are para to each other or diagonally disposed when present on a naphthalene ring). At least some of the hydrogen atoms present upon an aromatic ring of moiety IV may be substituted. Such optimal substitution may be an alkyl group of 1 to 4 carbon atoms, an alkoxy group of 1 to 4 carbon atoms, halogen (e.g. F, Cl, Br), a phenyl group, and mixtures of the foregoing. Moiety IV comprises approximately 10 to 45 mole percent of the polyester, and preferably approximately 20 to 30 mole percent (e.g., approximately 25 mole percent). Preferred moieties which may serve as a symmetrical dioxyaryl moiety in the polyester of the present invention include:

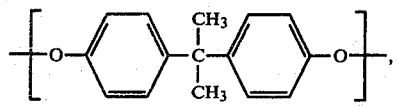

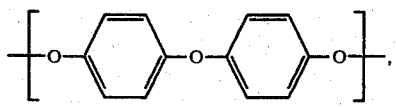

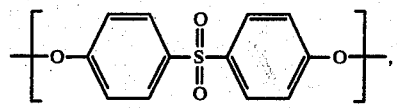

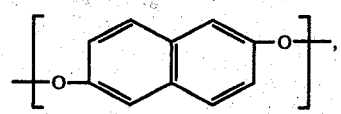

and mixtures of the foregoing.

The particularly preferred dioxyaryl moiety is:

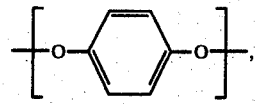

which may be derived from hydroquinone. Representative examples of ring substituted compounds from which moiety IV can be derived include methylhydroquinone, chlorohydroquinone, bromohydroquinone, phenylhydroquinone, etc. An example of a non-symmetrical dioxyaryl moiety is that derived from resorcinol.

Other ester-forming moieties (e.g., dicarboxy units, dioxy units and/or other combined oxy and carboxy units) other than moieties I, II, III and IV additionally may be included in the polyester of the present invention in a minor concentration (e.g., up to about 10 mole percent) so long as such moieties do not adversely influence the desired anisotropic melt phase exhibited by the polyester heretofore defined and do not raise the melting temperature of the resulting polymer much above that specified. As will be apparent to those skilled in the art, the total molar quantities of dioxy units and dicarboxy units present within the polyester will be substantially equal. Additionally, a minor quantity of another moiety derived from an aromatic hydroxy acid such as 3-oxybenzoyl moiety which is derived from 3-hydroxybenzoic acid optionally may be included in the polyester together with moieties I, II, III and IV. This component has the propensity to soften the polymer and to reduce or eliminate crystallinity thus increasing the amorphous nature of the polymer. In a preferred embodiment the polyester is formed solely of moieties I, II, III and IV.

The polyester of the present invention commonly exhibits

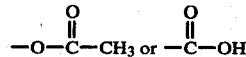

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

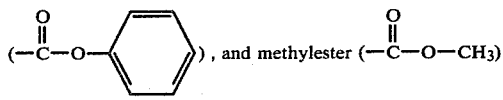, and methylester (—C(=O)—O—CH₃)

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The polyesters of the present invention tend to be substantially insoluble in all common polyester solvents, such as hexafluroisopropanol and o-chlorophenol, and accordingly are not susceptible to solution processing. They can surprisingly be readily processed by common melt processing techniques as discussed hereafter. Most compositions are soluble in pentafluorophenol.

The polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in a pentafluorophenol solution may be employed to determine the molecular weight.

The polyester prior to heat treatment additionally commonly exhibits an inherent viscosity (i.e., I.V.) of at least approximately 1.0 dl./g. and preferably at least approximately 2.0 dl./g. (e.g., approximately 3.0 to 9.0 dl./g.) when dissolved in a concentration of 0.1 percent by weight in pentafluorophenol at 60° C.

The polyesters of the present invention commonly may be considered crystalline in the sense that fibers melt extruded therefrom exhibit x-ray diffraction patterns using Ni-filtered CuK α radiation and flat plate cameras characteristic of polymeric crystalline materials. In those embodiments wherein aromatic ring substitution is present as previously described, the polyesters may be substantially less crystalline in the solid phase and exhibit diffraction patterns typical of oriented amorphous fibers. In spite of the crystallinity commonly observed, the polyester of the present invention nevertheless may be easily melt processed in all instances.

Unlike polyesters commonly encountered in much of the prior art, the polyester of the present invention is not intractable and forms an anisotropic melt phase whereby an a typical degree of order is manifest in the molten polymer. The subject polyester readily forms liquid crystals in the melt phase and accordingly exhibits its a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow), however, the sample is optically anisotropic even in the static state.

The polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated to form a melt solution of the reactants. A vacuum may be applied to facilitate removal of volatiles formed during the final stage of the condensation (e.g., acetic acid or water).

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which the 6-oxy-2-naphthoyl moiety (i.e., moiety I), the 4-oxybenzoyl moiety (i.e., moiety II), and the dioxyaryl moiety (i.e., moiety IV), are derived may be initially provided in a modified form whereby the usual hydroxyl groups of these monomers are esterified (i.e., they are provided as acyl esters). For instance, lower acyl esters of 6-hydroxy-2-naphthoic acid, 4-hydroxy benzoic acid, and hydroquinone, wherein the hydroxy groups are esterified may be provided as reactants. The lower acyl groups preferably have from about 2 to about 4 carbon atoms. Preferably the acetate esters of the organic compounds which form moieties I, II and IV are provided. Accordingly, particularly preferred reactants for the condensation reaction are 6-acetoxy-2-naphthoic acid, 4-acetoxybenzoic acid, and hydroquinone diacetate. If minor quantities of other aryl reactants (as previously discussed) optionally provide oxy-units within the resulting polymer, these too preferably are provided as the corresponding lower acyl esters.

Representative catalysts which optionally may be employed in either the melt hydrolysis procedure or in the procedure of U.S. Pat. No. 4,067,852 include dialkyl tin oxide (i.e., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., BF₃), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed polyester may be further increased via a solid state polymerization procedure wherein the particulate polymer is heated in an inert atmosphere (e.g., in a nitrogen atmosphere at a temperature of about 260° C. for 10 to 12 hours). The exact heating temperature employed is influenced by the softening point of the specific polymer.

drying were next molded into standard test specimens employing an Arburg Allrounder injection molding machine, Model No. 221E/150 while employing the following parameters:

|  | Example | Comparative Polyester (U.S. Pat. No. 4,219,461) |
|---|---|---|
| Cylinder Temperature |  |  |
| Rear | 550° F. | 590° F. |
| Front | 550° F. | 590° F. |
| Nozzle | 550° F. | 590° F. |
| Mold Temperature | 70° F. | 70° F. |
| Screw RPM | 220 | 220 |
| Injection Pressure | 12000 psig | 8000 psig |
| Cycle Times |  |  |
| Injection | 10 seconds | 10 seconds |
| Cooling | 20 seconds | 20 seconds |
| Relay | 4 seconds | 4 seconds |
| Total | 34 seconds | 34 seconds |

The molded products were evaluated and the results reported hereafter represent an average of the data obtained from five test pieces per test. Tensile properties were determined according to the procedure of ASTM D638 Type V, flexural properties in accordance with the procedure of ASTM D790, and the notched Izod impact strength in accordance with the procedure of ASTM D256.

|  | Example | Comparative Polyester (U.S. Pat. No. 4,219,461) |
|---|---|---|
| Tensile Break, psi | 12,500 | 32,700 |
| Elongation (percent) | 5.5 | 2.5 |
| Tensile Modulus, psi | $0.42 \times 10^6$ | $2.26 \times 10^6$ |
| Flexural Break, psi | 6,750* | 21,200 |
| Flexural Modulus, psi | $0.33 \times 10^6$ | $1.27 \times 10^6$ |
| Notched Izod Impact strength; ft.-lbs. | 22.4+ | 4.6 |

Notes:
*Samples did not break (this value is the load at 5 percent deflection)
+Some samples did not break cleanly.

The above data demonstrates that the polyester of the present invention exhibits outstanding toughness and high impact strength in combination with highly desirable anisotropic melt properties.

For further comparative purposes it is reported in the literature that a high impact polyamide molding resin commercially marketed under the designation "Zytel ST Super-Tough Nylon" by E. I. DuPont de Nemours & Company, in the unmodified state yields a Notched Izod impact strength of 17 ft.-lbs. at 73° F. in the dried as molded state. However, such resin has a published tensile strength of only 7,500 psi at 73° F. in the dried as molded state, and a flexural modulus of $0.245 \times 10^6$ psi under the same conditions. Additionally, such polyamide is hygroscopic and is seriously affected by moisture, while the polyester of the Example is unaffected by moisture. Further processing advantages accrue from the fact that the polyester of the present invention is not hygroscopic as are polyamides, and accordingly requires less vigorous drying procedures prior to molding.

Although the invention has been described with a preferred embodiment it is to be understood that variations and modifications may be employed without departing from the concept of the invention as defined in the following claims.

We claim:

1. A melt processable polyester capable of forming an anisotropic melt phase at a temperature below approximately 350° C. consisting essentially of the recurring moieties I, II, III, and IV which optionally may include substitution of at least some of the hydrogen atoms present upon an aromatic ring wherein:

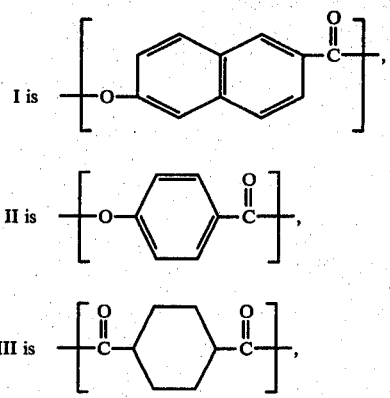

wherein at least approximately 90 percent of said III units are in the trans-configuration, and
IV is a dioxyaryl moiety of the formula

where Ar is a divalent radical comprising at least one aromatic ring,
with said optional substitution if present being selected from the group consisting of an alkyl group of 1 to 4 carbon atoms, an alkoxy group of 1 to 4 carbon atoms, halogen, a phenyl group, and mixtures of the foregoing, and wherein said polyester comprises approximately 10 to 70 mole percent of moiety I, approximately 10 to 60 mole percent of moiety II, approximately 10 to 45 mole percent of moiety III, and approximately 10 to 45 mole percent of moiety IV.

2. A melt processable polyester according to claim 1 which is capable of forming an anisotropic melt phase at a temperature below approximately 320° C.

3. A melt processable polyester according to claim 1 which is capable of undergoing melt processing at a temperature in the range of approximately 230° to 320° C.

4. A melt processable polyester according to claim 1 wherein each moiety is substantially free of ring substitution.

5. A melt processable polyester according to claim 1 wherein said dioxyaryl moiety IV is symmetrically disposed.

6. A melt processable polyester according to claim 1 wherein said dioxyaryl moiety IV is selected from the group consisting of:

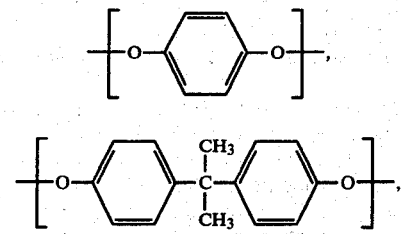

The polyester of the present invention readily can be melt processed to form a variety of shaped articles, e.g., molded three-dimensional articles, fibers, films, tapes, etc. The polyester of the present invention is particularly suited for molding applications and may be molded via standard injection molding techniques commonly utilized when forming molded articles. Unlike many polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the polyester of the present invention which incorporates approximately 1 to 60 percent by weight of a solid filler (e.g., talc) and/or reinforcing agent (e.g., glass fibers).

The polyester also may be employed as a coating material which is applied as a powder or from a liquid dispersion.

The resulting shaped articles optionally may be subjected to a thermal treatment whereby the physical properties are further enhanced. More specifically, the shaped articles may be thermally treated in an inert atmosphere (e.g., nitrogen, argon, or helium) or a flowing oxygen-containing atmosphere (e.g., air) at a temperature below the melting temperature until the desired property enhancement is achieved. Thermal treatment times commonly range from a few minutes to several days. Optimum heat treatment conditions will vary with the specific composition of the polyester.

The molded articles formed from the polyester of the present invention possess unusually high impact properties. Such impact properties as indicated hereafter have been found to be substantially superior to those of the polyester of commonly assigned U.S. Pat. No. 4,219,461. Accordingly, the polyester is particularly suited for use in the formation of molded articles in which elongation, flexibility and the ability to withstand impact are of prime importance. Additionally, the polyester claimed herein, unlike certain polyamides having recognized superior impact properties, is not deleteriously plasticized upon contact with water. Such stability in the presence of water further renders the polyester of the present invention useful in a wider range of environments.

The following example is presented as a specific illustration of the claimed invention. It should be understood, however, that the invention is not limited to the specific details set forth in the example.

EXAMPLE

To a two liter three-neck flask fitted with a sealed glass paddle-stirrer, gas inlet tube, and a distillation head with thermometer and condenser were added the following:
(a) 138.0 grams of 6-acetoxy-2naphthoic acid (0.60 mole),
(b) 162.0 grams of 4-acetoxybenzoic acid (0.90 mole),
(c) 129.0 grams of 95 percent trans-1,4-cyclohexane dicarboxylic acid (0.75 mole),
(d) 151.8 grams of hydroquinone diacetate (0.782 mole), and
(e) 0.12 grams of fused sodium acetate catalyst.

After purging by evacuation the flask was flushed three times with nitrogen, and was heated in an oil bath at 250° C. The contents of the flask melted to a clear brown liquid and acetic acid rapidly began to distil over. Soon thereafter the melt assumed a hazy appearance and then changed to an opaque appearance. After 45 minutes at 250° C. a total of 123 ml. (72 percent theoretical yield) of acetic acid had been collected. The temperature was next raised to 280° C. and heating continued for an additional 45 minutes. During such heating the contents of the flask became creamy, opalescent, and slightly viscous. At the end of the 45 minutes while heated at 280° C. a total of 157 ml. (91 percent theoretical yield) of acetic acid had distilled over. The temperature was next raised to 300° C. and held there for 45 minutes. At the end of the 45 minutes while heated at 300° C. a total of 170 ml. (99 percent theoretical yield) of acetic acid had distilled over. During this stage the contents of the flask became somewhat foamy. The temperature was next raised to 310° C. and held there for 45 minutes during which time the foamy appearance of the contents of the flask disappeared. At the end of this time a final yield of 173.2 ml. (101 percent of theoretical yield) of acetic acid had been collected. [The excess yield of acetic acid may have been attributable to a slight amount of acetic acid impurity which was introduced during the recrystallization of the 6-acetoxy-2-naphthoic acid monomer prior to polymer formation.]

Next a vacuum of 0.5 Torr was slowly applied and the contents of the flask were stirred for an additional 60 minutes at 310° C. which was gradually raised to 320° C. at the end of such heating. At this point the contents of the flask became viscous and began to cling somewhat to the stirrer shaft. The vacuum was released with nitrogen, the stirrer was removed from the molten polymer, and the polymer was allowed to cool while present under the stream of nitrogen.

When cool the polymer product was ground in a Wiley mill, was extracted for two hours with acetone in a Soxhlet apparatus to remove any low molecular weight impurities, and was dried.

The inherent viscosity (I.V.) of the polymer was approximately 4.37 dl./g. as determined in a pentafluorophenol solution of 0.1 percent by weight concentration at 60° C. in accordance with the formula:

$$I.V. = (\ln (\eta rel)/c),$$

where c=concentration of solution (0.1 percent by weight), and $\eta rel$=relative viscosity. When the polymer was subjected to differential scanning calorimetry (20° C./min. heating rate), it exhibited a melt endotherm at approximately 268° C. A slight second order transition inflection was observed at 90° C. The polymer melt was highly optically anisotropic.

For comparative purposes the polyester of U.S. Pat. No. 4,219,461 was prepared with terephthalic acid being substituted for the 1,4-cyclohexane dicarboxylic monomer of the foregoing example. More specifically, the polymerization was carried out as heretofore described with this monomer substitution under substantially identical polymerization conditions with the exception that the final polymerization temperature was 340° C. This was done since the resulting polymer exhibited a higher melt endotherm of approximately 305° C. The polyester of U.S. Pat. No. 4,219,461 additionally exhibited an inherent viscosity of approximately 6.6 dl./g. as determined in a pentafluorophenol solution of 0.1 percent by weight concentration at 60° C., a second order transition inflection at 90° C., and a highly anisotropic melt phase.

The polyester of the Example and the polyester of commonly assigned U.S. Pat. No. 4,219,461 following

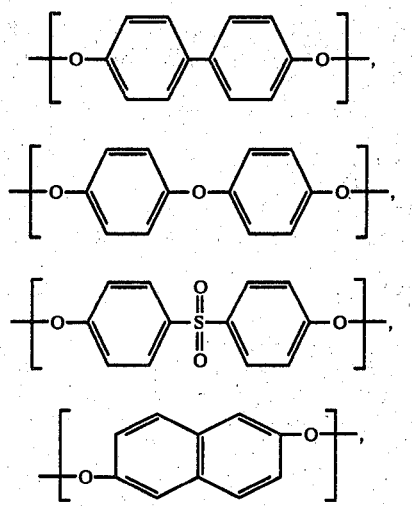

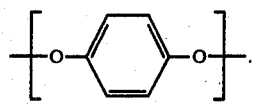

and mixtures of the foregoing.

7. A melt processable polyester according to claim 1 wherein said dioxyaryl moiety IV is

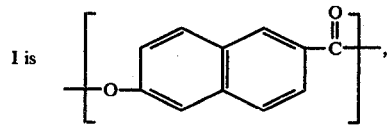

8. A melt processable polyester according to claim 1 which exhibits an inherent viscosity of at least approximately 1.0 dl./g. when dissolved in a concentration of 0.1 percent by weight in pentafluorophenol at 60° C.

9. A melt processable polyester according to claim 8 which exhibits an inherent viscosity of at least approximately 2.0 dl./g. when dissolved in a concentration of 0.1 percent by weight in pentafluorophenol at 60° C.

10. A melt processable polyester according to claim 8 which exhibits an inherent viscosity within the range of approximately 3.0 to 9.0 dl./g. when dissolved in a concentration of 0.1 percent by weight in pentafluorophenol at 60° C.

11. A molded article comprising the melt processable polyester of claim 1.

12. A molding compound comprising the melt processable polyester of claim 1 which incorporates approximately 1 to 60 percent by weight of a solid filler and/or reinforcing agent.

13. A melt processable polyester capable of forming an anisotropic melt phase at a temperature below approximately 320° C. consisting essentially of the recurring moieties I, II, III, and IV which optionally may include substitution of at least some of the hydrogen atoms present upon an aromatic wherein:

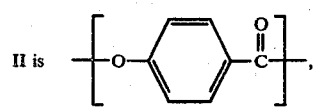

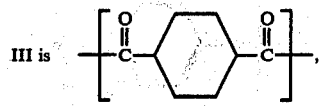

wherein at least approximately 95 percent of said III units are in the trans-configuration, and IV is a symmetrical dioxyaryl moiety of the formula —O—Ar—O— where Ar is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group, and mixtures of the foregoing, and wherein said polyester comprises approximately 15 to 30 mole percent of moiety I, approximately 20 to 40 mole percent of moiety II, approximately 20 to 30 mole percent of moiety III, and approximately 20 to 30 mole percent of moiety IV.

14. A melt processable polyester according to claim 13 which is capable of undergoing melt processing at a temperature in the range of approximately 230° to 320° C.

15. A melt processable polyester according to claim 13 wherein each moiety is substantially free of ring substitution.

16. A melt processable polyester according to claim 13 wherein said dioxyaryl moiety IV is selected from the group consisting of:

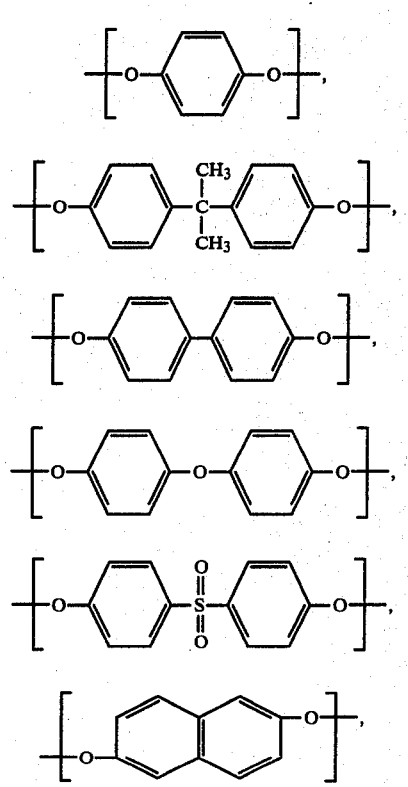

and mixtures of the foregoing.

17. A melt processable polyester according to claim 13 wherein said dioxyaryl moiety IV is

18. A melt processable polyester according to claim 17 which comprises approximately 20 mole percent of moiety I, approximately 30 mole percent of moiety II, approximately 25 mole percent of moiety III, and approximately 25 mole percent of moiety IV, and wherein each moiety is substantially free of ring substitution.

19. A melt processable polyester according to claim 13 which exhibits an inherent viscosity of at least approximately 1.0 dl./g. when dissolved in a concentration of 0.1 percent by weight in pentafluorophenol at 60° C.

20. A melt processable polyester according to claim 13 which exhibits an inherent viscosity of at least approximately 2.0 dl./g. when dissolved in a concentration of 0.1 percent by weight in pentafluorophenol at 60° C.

21. A melt processable polyester according to claim 13 which exhibits an inherent viscosity within the range of approximately 3.0 to 9.0 dl./g. when dissolved in a concentration of 0.1 percent by weight in pentafluorophenol at 60° C.

22. A molded article comprising the melt processable polyester of claim 13.

23. A molding compound comprising the melt processable polyester of claim 13 which incorporates approximately 1 to 60 percent by weight of a solid filler and/or reinforcing agent.

* * * * *